US011554874B2

(12) United States Patent
Drolet et al.

(10) Patent No.: US 11,554,874 B2
(45) Date of Patent: Jan. 17, 2023

(54) METHOD AND SYSTEM FOR GOVERNING AN ENGINE AT LOW POWER

(71) Applicant: PRATT & WHITNEY CANADA CORP., Longueuil (CA)

(72) Inventors: Martin Drolet, Saint-Amable (CA); Frederic Fortin, Sainte-Catherine (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 35 days.

(21) Appl. No.: 17/061,657

(22) Filed: Oct. 2, 2020

(65) Prior Publication Data

US 2022/0106913 A1 Apr. 7, 2022

(51) Int. Cl.
| | |
|---|---|
| *B64D 31/00* | (2006.01) |
| *B64D 27/10* | (2006.01) |
| *F02C 9/20* | (2006.01) |
| *F02C 6/02* | (2006.01) |
| *B64D 35/08* | (2006.01) |

(Continued)

(52) U.S. Cl.
CPC ............. *B64D 31/00* (2013.01); *B64D 27/10* (2013.01); *B64D 35/08* (2013.01); *F02C 6/02* (2013.01); *F02C 6/18* (2013.01); *F02C 9/16* (2013.01); *F02C 9/20* (2013.01); *F05D 2220/323* (2013.01); *F05D 2220/329* (2013.01); *F05D 2270/13* (2013.01); *F05D 2270/304* (2013.01)

(58) Field of Classification Search
CPC ........ B64D 35/08; B64D 27/10; B64D 31/00; B64D 31/06; F02C 6/02; F02C 9/18; F02C 9/20; F05D 2270/13
See application file for complete search history.

(56) References Cited

U.S. PATENT DOCUMENTS 3,659,422 A * 5/1972 Hope .................... F02K 1/1207
  60/224
4,928,482 A * 5/1990 Pollak ...................... F02K 1/17
  60/39.27

(Continued)

FOREIGN PATENT DOCUMENTS

| EP | 3693582 A1 | 8/2020 |
| EP | 3715248 A1 | 9/2020 |

OTHER PUBLICATIONS

European Patent Office, Communication re. extended European search report for European patent application No. 21200807.2, dated Feb. 18, 2022.

*Primary Examiner* — Alain Chau
(74) *Attorney, Agent, or Firm* — Norton Rose Fulbright Canada LLP

(57) ABSTRACT

There are described methods and systems for operating an aircraft having two or more engines. One method comprises operating the two or more engines of the aircraft in an asymmetric operating regime, wherein a first of the engines is in an active mode to provide motive power to the aircraft and a second of the engines is in a standby mode to provide substantially no motive power to the aircraft; governing the first engine in the active mode using a first governing logic; and governing the second engine in the standby mode using a second governing logic, the second governing logic based on a target compressor speed and variable geometry mechanism (VGM) settings that are adjusted using trim values dependent on at least one parameter of the second engine in the standby mode.

10 Claims, 11 Drawing Sheets

(51) Int. Cl.
*F02C 9/16* (2006.01)
*F02C 6/18* (2006.01)

(56) References Cited

U.S. PATENT DOCUMENTS

| | | | | |
|---|---|---|---|---|
| 4,947,643 | A * | 8/1990 | Pollak | F02C 9/28 60/236 |
| 7,647,778 | B2 * | 1/2010 | Zewde | F02C 9/18 60/779 |
| 8,661,832 | B2 * | 3/2014 | Griffin | F04D 27/0223 137/15.2 |
| 10,227,931 | B2 * | 3/2019 | Stockwell | F04D 29/563 |
| 10,337,409 | B2 * | 7/2019 | Bedrine | B64C 27/04 |
| 10,408,217 | B2 * | 9/2019 | Moeckel | F04D 27/023 |
| 10,760,484 | B2 * | 9/2020 | Alecu | F02C 6/20 |
| 10,822,104 | B2 * | 11/2020 | Beauchesne-Martel | F01D 17/105 |
| 11,193,387 | B2 * | 12/2021 | Yardibi | F01D 21/003 |
| 2007/0137214 | A1 * | 6/2007 | Zewde | F02C 9/18 60/782 |
| 2011/0056210 | A1 * | 3/2011 | Griffin | F02C 9/18 60/773 |
| 2016/0237917 | A1 * | 8/2016 | Marconi | F01D 15/12 |
| 2017/0016399 | A1 * | 1/2017 | Bedrine | F02C 6/08 |
| 2017/0159574 | A1 * | 6/2017 | Paul | F02C 9/42 |
| 2017/0268520 | A1 * | 9/2017 | Moeckel | F04D 27/001 |
| 2018/0080378 | A1 * | 3/2018 | Alecu | F02C 6/02 |
| 2018/0201386 | A1 * | 7/2018 | Strauss | B64C 27/12 |
| 2019/0017409 | A1 * | 1/2019 | Yardibi | F02C 9/00 |
| 2019/0061969 | A1 * | 2/2019 | Beauchesne-Martel | F01D 17/105 |
| 2020/0047876 | A1 * | 2/2020 | Morgan | F02C 7/36 |
| 2020/0049025 | A1 * | 2/2020 | Morgan | B64C 27/12 |
| 2020/0255159 | A1 * | 8/2020 | Manoukian | F02C 9/00 |
| 2020/0256265 | A1 * | 8/2020 | Manoukian | F02C 9/42 |
| 2020/0309038 | A1 * | 10/2020 | Ng | B64D 31/06 |

\* cited by examiner

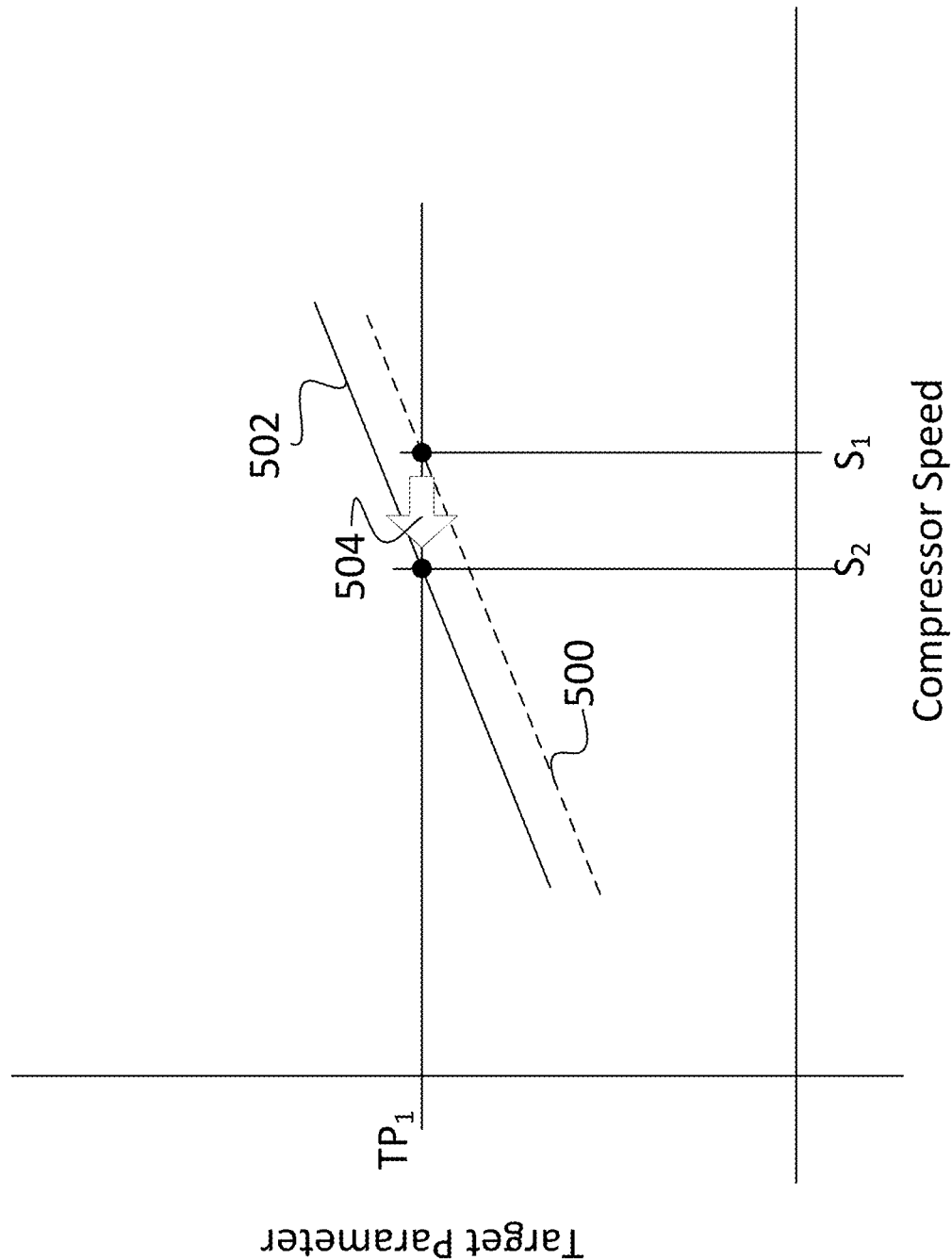

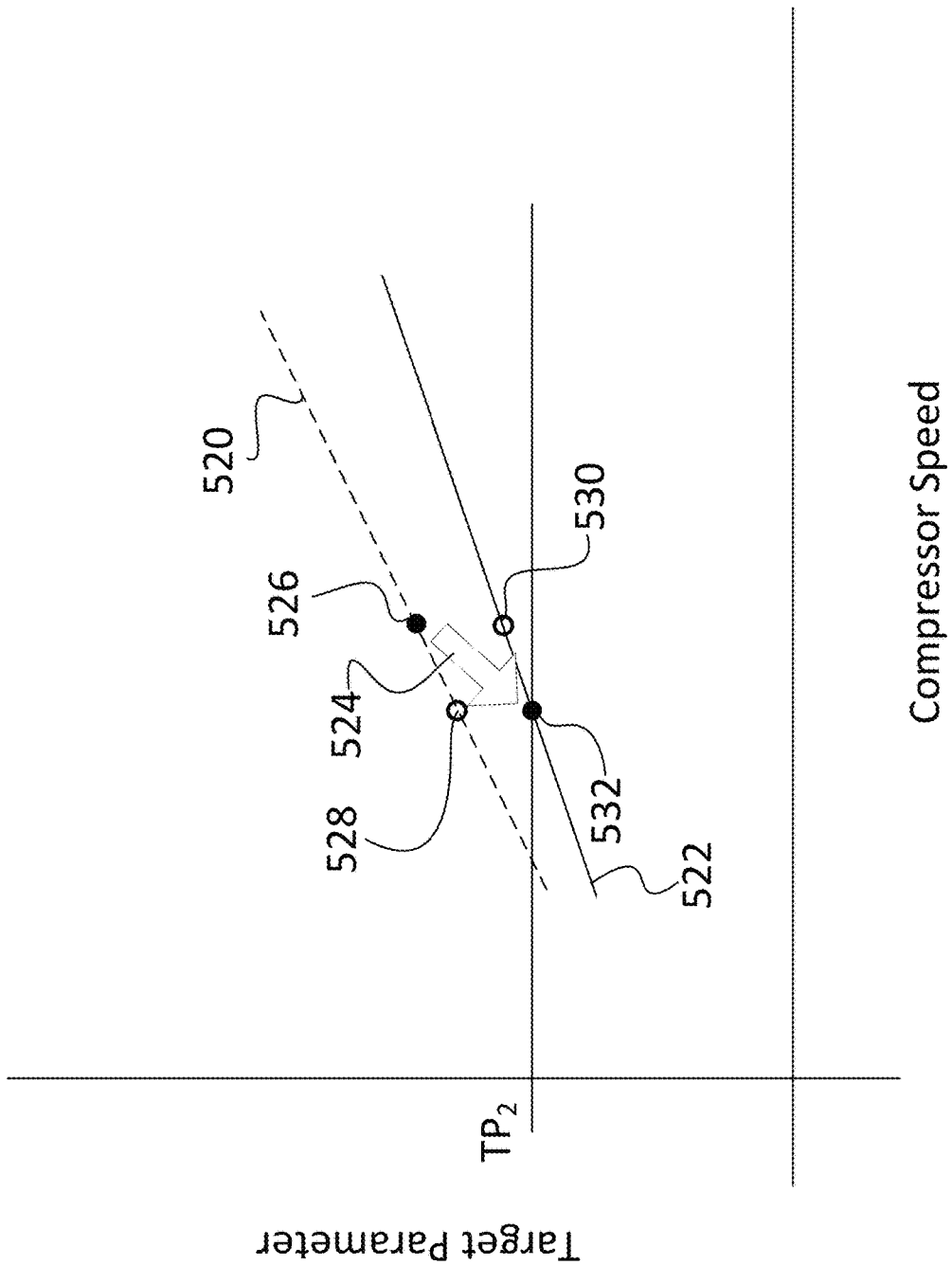

METHOD AND SYSTEM FOR GOVERNING AN ENGINE AT LOW POWER

TECHNICAL FIELD

The present disclosure relates generally to engine governing, and more particularly to engine governing logic for an engine operating at low power.

BACKGROUND OF THE ART

When operating aircraft with multiple engines, there may be certain portions of a mission that do not require both engines to be operating at full power. In cruising conditions, operating a single engine at a relatively high power, instead of multiple engines at lower power, may allow for better fuel efficiency. For example, one or more engine(s) are operated at high power, and one or more remaining engine(s) are operated in what is sometimes referred to as a "standby" mode. However, engine governing can be challenging at certain power/ratings.

Therefore, improvements are needed.

SUMMARY

In one aspect, there is provided a method for operating an aircraft having two or more engines. The method comprises operating the two or more engines of the aircraft in an asymmetric operating regime, wherein a first of the engines is in an active mode to provide motive power to the aircraft and a second of the engines is in a standby mode to provide substantially no motive power to the aircraft; governing the first engine in the active mode using a first governing logic; and governing the second engine in the standby mode using a second governing logic, the second governing logic based on a target compressor speed and variable geometry mechanism (VGM) settings that are adjusted using trim values dependent on at least one parameter of the second engine in the standby mode.

In another aspect, there is provided a method for operating a gas turbine engine. The method comprises obtaining a target compressor speed and variable geometry mechanism (VGM) settings that are adjusted using trim values dependent on at least one parameter of the engine operating in a given operating mode; determining an error between the adjusted target compressor speed and an actual compressor speed of the engine; and adjusting fuel flow to the engine based on the error when the engine is in the given operating mode In a further aspect, there is provided a system for operating an aircraft having two or more engines. The system comprises at least one processing unit and a non-transitory computer readable medium having stored thereon program code. The program code is executable by the processing unit for operating the two or more engines of the aircraft in an asymmetric operating regime, wherein a first of the engines is in an active mode to provide motive power to the aircraft and a second of the engines is in a standby mode to provide substantially no motive power to the aircraft; governing the first engine in the active mode using a first governing logic; and governing the second engine in the standby mode using a second governing logic, the second governing logic based on a target compressor speed and variable geometry mechanism (VGM) settings that are adjusted using trim values dependent on at least one parameter of the second engine in the standby mode.

DESCRIPTION OF THE DRAWINGS

Reference is now made to the accompanying figures in which:

FIGS. 5A-5C are graphical illustrations of applying trims to engine parameters;

DETAILED DESCRIPTION

There are described herein methods and systems for governing an engine in an aircraft having two or more engines. Under certain conditions, it can be desirable to operate an aircraft in a so-called "asymmetric operating regime" (AOR) which is described in greater detail hereinbelow. When operated in the AOR, multiple engines of the aircraft, which may be a multi-engine helicopter or other rotorcraft, are operated at different output power levels.

Figure 1A:
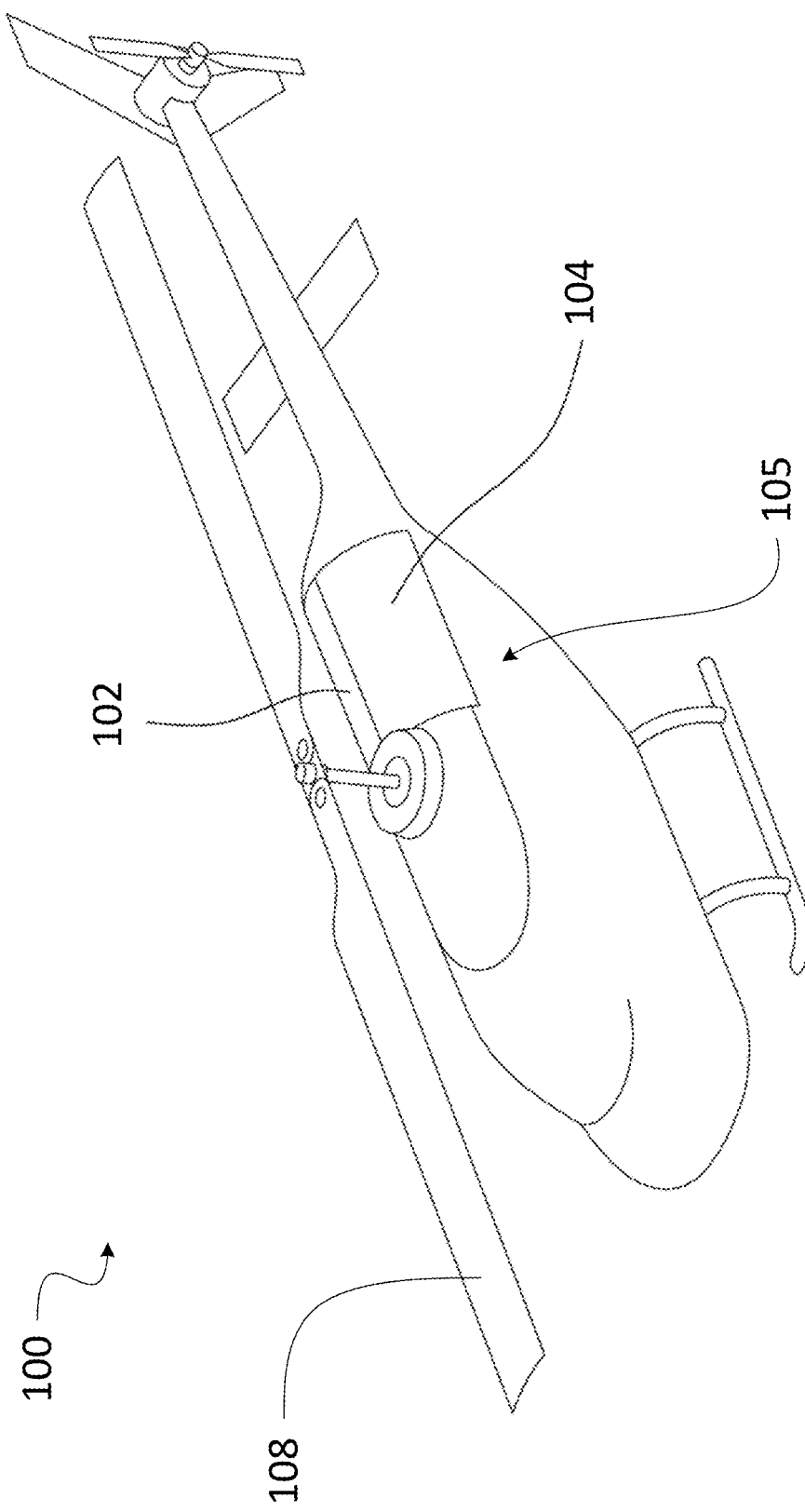
FIG. 1A is a schematic cross-sectional view of a multi-engine aircraft.

FIG. 1A depicts an exemplary multi-engine aircraft 100, which in this case is a helicopter. The aircraft 100 includes at least two gas turbine engines 102, 104. These two engines 102, 104 may be interconnected, in the case of the depicted helicopter application, by a common gearbox to form a multi-engine system 105, as shown in FIG. 1B, which drives a main rotor 108.

Figure 1B:
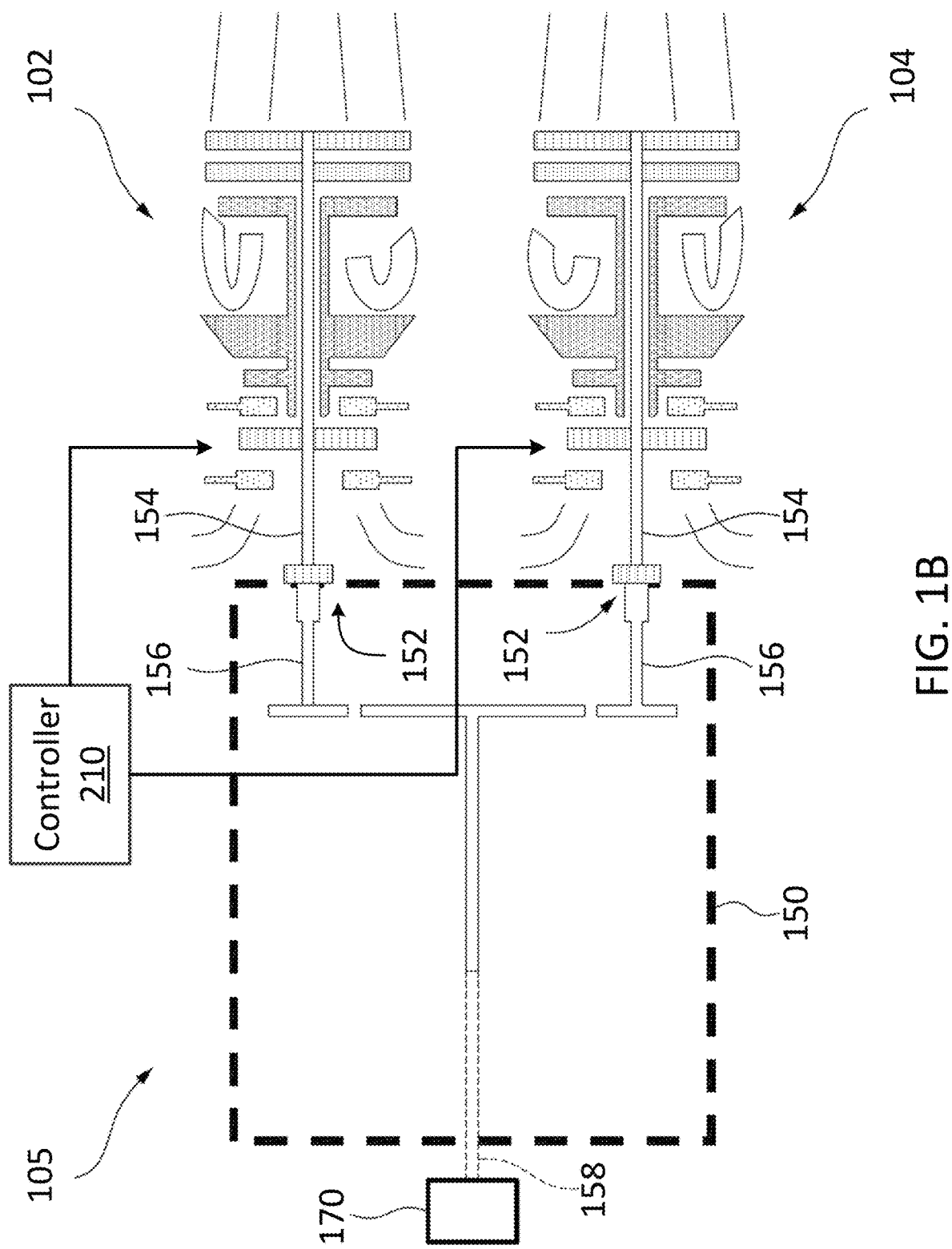
FIG. 1B is a schematic representation of an exemplary multi-engine system for the aircraft of FIG. 1A, showing axial cross-sectional views of two gas turbine engines.

Turning now to FIG. 1B, illustrated is an exemplary multi-engine system 105 that may be used as a power plant for an aircraft, including but not limited to a rotorcraft such as the helicopter 100. The multi-engine system 105 may include two or more gas turbine engines 102, 104. In the case of a helicopter application, these gas turbine engines 102, 104 will be turboshaft engines. Control of the multi-engine system 105 is effected by one or more controller(s) 210, which may be Full Authority Digital Engine Control(s) (FADEC(s)), electronic engine controller(s) (EEC(s)), or the like, that are programmed to manage, as described herein below, the operation of the engines 102, 104 to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the system 105. Other phases of a typical helicopter mission include transient phases like take-off, climb, stationary flight (hovering), approach and landing. Cruise may occur at higher altitudes and higher speeds, or at lower altitudes and speeds, such as during a search phase of a search-and-rescue mission.

More particularly, the multi-engine system 105 of this embodiment includes first and second turboshaft engines 102, 104 each having a respective transmission 152 interconnected by a common output gearbox 150 to drive a common load 170. In one embodiment, the common load 170 may comprise a rotary wing of a rotary-wing aircraft. For example, the common load 170 may be a main rotor 108 of the aircraft 100. Depending on the type of the common load 170 and on the operating speed thereof, each of turboshaft engines 102, 104 may be drivingly coupled to the common load 170 via the output gearbox 150, which may be of the speed-reduction type.

For example, the gearbox 150 may have a plurality of transmission shafts 156 to receive mechanical energy from respective output shafts 154 of respective turboshaft engines 102, 104. The gearbox 150 may be configured to direct at least some of the combined mechanical energy from the plurality of the turboshaft engines 102, 104 toward a common output shaft 158 for driving the common load 170 at a suitable operating (e.g., rotational) speed. It is understood that the multi-engine system 105 may also be configured, for example, to drive accessories and/or other elements of an associated aircraft. As will be described, the gearbox 150 may be configured to permit the common load 170 to be driven by either of the turboshaft engines 102, 104 or, by a combination of both engines 102, 104 together.

In the present disclosure, while the aircraft conditions (cruise speed and altitude) are substantially stable, the engines 102, 104 of the system 105 may be operated asymmetrically, with one engine operated in a high-power "active" mode and the other engine operated in a lower-power (which could be no power, in some cases) "standby" mode. Doing so may provide fuel saving opportunities to the aircraft, however there may be other suitable reasons why the engines are desired to be operated asymmetrically. This operation management may therefore be referred to as an "asymmetric mode" or the aforementioned AOR, wherein one of the two engines is operated in a lower-power (which could be no power, in some cases) "standby mode" while the other engine is operated in a high-power "active" mode. Such an asymmetric operation may be engaged for a cruise phase of flight (continuous, steady-state flight which is typically at a given commanded constant aircraft cruising speed and altitude). The multi-engine system 105 may be used in an aircraft, such as the helicopter 100, but also has applications in suitable marine and/or industrial applications or other ground operations.

Referring still to FIG. 1B, according to the present disclosure, the multi-engine system 105 is driving in this example the helicopter 100 which may be operated in the AOR, in which a first of the turboshaft engines (say, 102) may be operated at high power in an active mode and the second of the turboshaft engines (104 in this example) may be operated in a lower-power (which could be no power, in some cases) standby mode. In one example, the first turboshaft engine 102 may be controlled by the controller(s) 210 to run at full (or near-full) power conditions in the active mode, to supply substantially all or all of a required power and/or speed demand of the common load 170. The second turboshaft engine 104 may be controlled by the controller(s) 210 to operate at lower-power or no-output-power conditions to supply substantially none or none of a required power and/or speed demand of the common load 170. Optionally, a clutch may be provided to declutch the low-power engine.

Controller(s) 210 may control the engine's governing on power according to an appropriate schedule or control regime, as will be described in more detail below. The controller(s) 210 may comprise a first controller for controlling the first engine 102 and a second controller for controlling the second engine 104. The first controller and the second controller may be in communication with each other in order to implement the operations described herein. In some embodiments, a single controller 210 may be used for controlling the first engine 102 and the second engine 104.

In another example, the AOR of the engines may be achieved through the one or more controller's 210 differential control of fuel flow to the engines, as described in U.S. Patent Application Publication No. 2020/0049025, the entire contents of which are incorporated herein by reference. Low fuel flow may also include zero fuel flow in some examples.

Although various differential control between the engines of the engine system 105 are possible, in one particular embodiment the controller(s) 210 may correspondingly control fuel flow rate to each engine 102, 104 accordingly. In the case of the standby engine, a fuel flow (and/or a fuel flow rate) provided to the standby engine may be controlled to be between 70% and 99.5% less than the fuel flow (and/or the fuel flow rate) provided to the active engine. In the AOR, the standby engine may be maintained between 70% and 99.5% less than the fuel flow to the active engine. In some embodiments, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 210 may operate one engine (say 104) of the multiengine system 105 in a standby mode at a power substantially lower than a rated cruise power level of the engine, and in some embodiments at substantially zero output power and in other embodiments less than 10% output power relative to a reference power (provided at a reference fuel flow). Alternatively still, in some embodiments, the controller(s) 210 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system 105 of FIG. 1B may be operated in an AOR by control of the relative speed of the engines using controller(s) 210, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the AOR, such as control based on a target pressure ratio, or other suitable control parameters.

Although the examples described herein illustrate two engines, AOR is applicable to more than two engines, whereby at least one of the multiple engines is operated in a low-power standby mode while the remaining engines are operated in the active mode to supply all or substantially all of a required power and/or speed demand of a common load.

In use, the first turboshaft engine (say 102) may operate in the active mode while the other turboshaft engine (say 104) may operate in the standby mode, as described above. During operation in the AOR, if the helicopter 100 needs a power increase (expected or otherwise), the second turboshaft engine 104 may be required to provide more power relative to the low power conditions of the standby mode, and possibly return immediately to a high- or full-power condition. This may occur, for example, in an emergency condition of the multi-engine system 105 powering the helicopter 100, wherein the "active" engine loses power the power recovery from the lower power to the high power may take some time. Even in the absence of an emergency, it will be desirable to repower the standby engine to exit the AOR.

Figure 2:
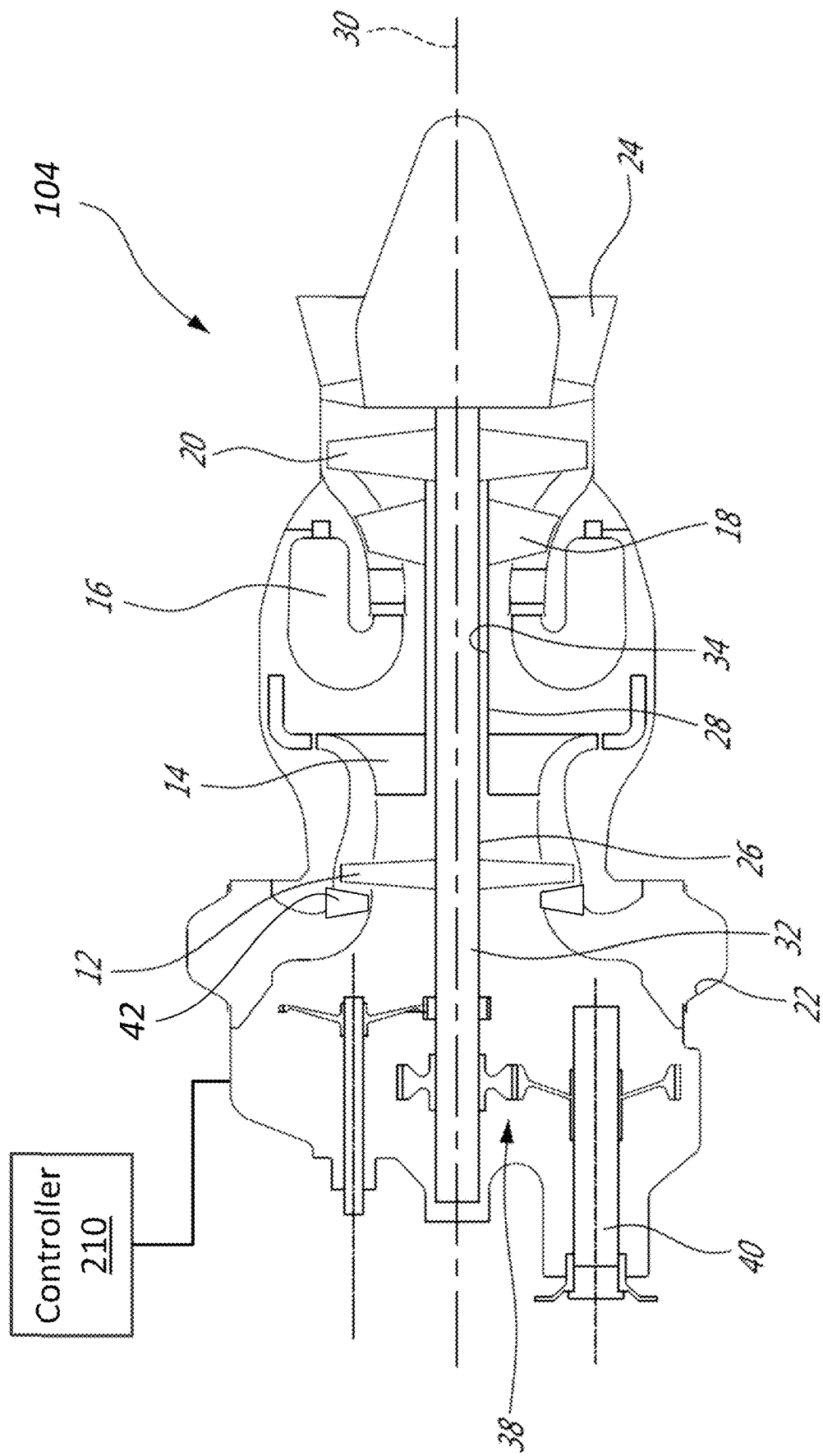
FIG. 2 is a schematic axial cross-sectional view of one of the gas turbine engines of FIG. 1B, for the multi-engine aircraft of FIG. 1A.

With reference to FIG. 2, the turboshaft engines 102, 104 can be embodied as gas turbine engines. Although the foregoing discussion relates to engine 104, it should be understood that engine 102 can be substantively similar to engine 104. In this example, the engine 104 is a turboshaft engine generally comprising in serial flow communication a low pressure (LP) compressor section 12 and a high pressure (HP) compressor section 14 for pressurizing air, a combustor 16 in which the compressed air is mixed with fuel and ignited for generating an annular stream of hot combustion gases, a high pressure turbine section 18 for extracting energy from the combustion gases and driving the high pressure compressor section 14, and a lower pressure turbine section 20 for further extracting energy from the combustion gases and driving at least the low pressure compressor section 12.

The low pressure compressor section 12 may independently rotate from the high pressure compressor section 14. The low pressure compressor section 12 may include one or more compression stages and the high pressure compressor section 14 may include one or more compression stages. A compressor stage may include a compressor rotor, or a combination of the compressor rotor and a compressor stator assembly. In a multistage compressor configuration, the compressor stator assemblies may direct the air from one compressor rotor to the next.

The engine 104 has multiple, i.e. two or more, spools which may perform the compression to pressurize the air received through an air inlet 22, and which extract energy from the combustion gases before they exit via an exhaust outlet 24. In the illustrated embodiment, the engine 104 includes a low pressure spool 26 and a high pressure spool 28 mounted for rotation about an engine axis 30. The low pressure and high pressure spools 26, 28 are independently rotatable relative to each other about the axis 30. The term "spool" is herein intended to broadly refer to drivingly connected turbine and compressor rotors.

The low pressure spool 26 includes a low pressure shaft 32 interconnecting the low pressure turbine section 20 with the low pressure compressor section 12 to drive rotors of the low pressure compressor section 12. In other words, the low pressure compressor section 12 may include at least one low pressure compressor rotor directly drivingly engaged to the low pressure shaft 32 and the low pressure turbine section 20 may include at least one low pressure turbine rotor directly drivingly engaged to the low pressure shaft 32 so as to rotate the low pressure compressor section 12 at a speed proportional to the low pressure turbine section 20 speed. The high pressure spool 28 includes a high pressure shaft 34 interconnecting the high pressure turbine section 18 with the high pressure compressor section 14 to drive rotors of the high pressure compressor section 14. In other words, the high pressure compressor section 14 may include at least one high pressure compressor rotor directly drivingly engaged to the high pressure shaft 34 and the high pressure turbine section 18 may include at least one high pressure turbine rotor directly drivingly engaged to the high pressure shaft 34 so as to rotate the high pressure compressor section 14 at a same speed as the high pressure turbine section 18. In some embodiments, the high pressure shaft 34 may be hollow and the low pressure shaft 32 extends therethrough. The two shafts 32, 34 are free to rotate independently from one another.

The engine 104 may include a transmission 38 driven by the low pressure shaft 32 and driving a rotatable output shaft 40. The transmission 38 may vary a ratio between rotational speeds of the low pressure shaft 32 and the output shaft 40.

The engine 104 comprises one or more variable geometry mechanism (VGM), such as inlet guide vanes (IGVs) 42 moveable for directing air into the compressor section 12 (e.g. compressor inlet guide vanes). For example, the IGVs 42 may comprise low-pressure compressor inlet guide vanes, mid-pressure compressor inlet guide vanes, and/or high-pressure compressor inlet guide vanes. It should however be understood that the VGM may in some embodiments consist of outlet guide vanes for directing air out of the compressor section 12, variable stator vanes for directing incoming air into rotor blades of the engine 104, variable nozzles, handling bleed valves, and the like.

As described hereinabove, control of the operation of the engine 104 can be effected by one or more control system, for example the controller 210. The controller 210 can modulate a fuel flow ($W_f$) provided to the engine 104, the position and/or orientation of the VGMs within the engine 104, a bleed level of the engine 104, and the like. In some embodiments, the controller 210 is configured for controlling operation of multiple engines, for instance the engines 102 and 104. For example, the controller 210 can be provided with one or FADECs or similar devices. Each FADEC can be assigned to control the operation of one or more of the engines 102, 104. Additionally, in some embodiments the controller 210 can be configured for controlling operation of other elements of the aircraft 100, for instance the main rotor 108.

In some embodiments, the controller 210 is configured for governing the engine 104 operating in standby mode using a governing logic that differs from a governing logic used at higher power ratings. For example, some governing logics based on fuel flow may be challenging in standby mode, due to the increased inaccuracy of the engine commanded fuel flow at low fuel flows. In addition, governing logics based on compressor or output shaft speed can result in variations from one engine to the other at low speeds. Therefore, there is described herein a governing logic suitable for governing an engine operating in a standby mode.

Figure 3:
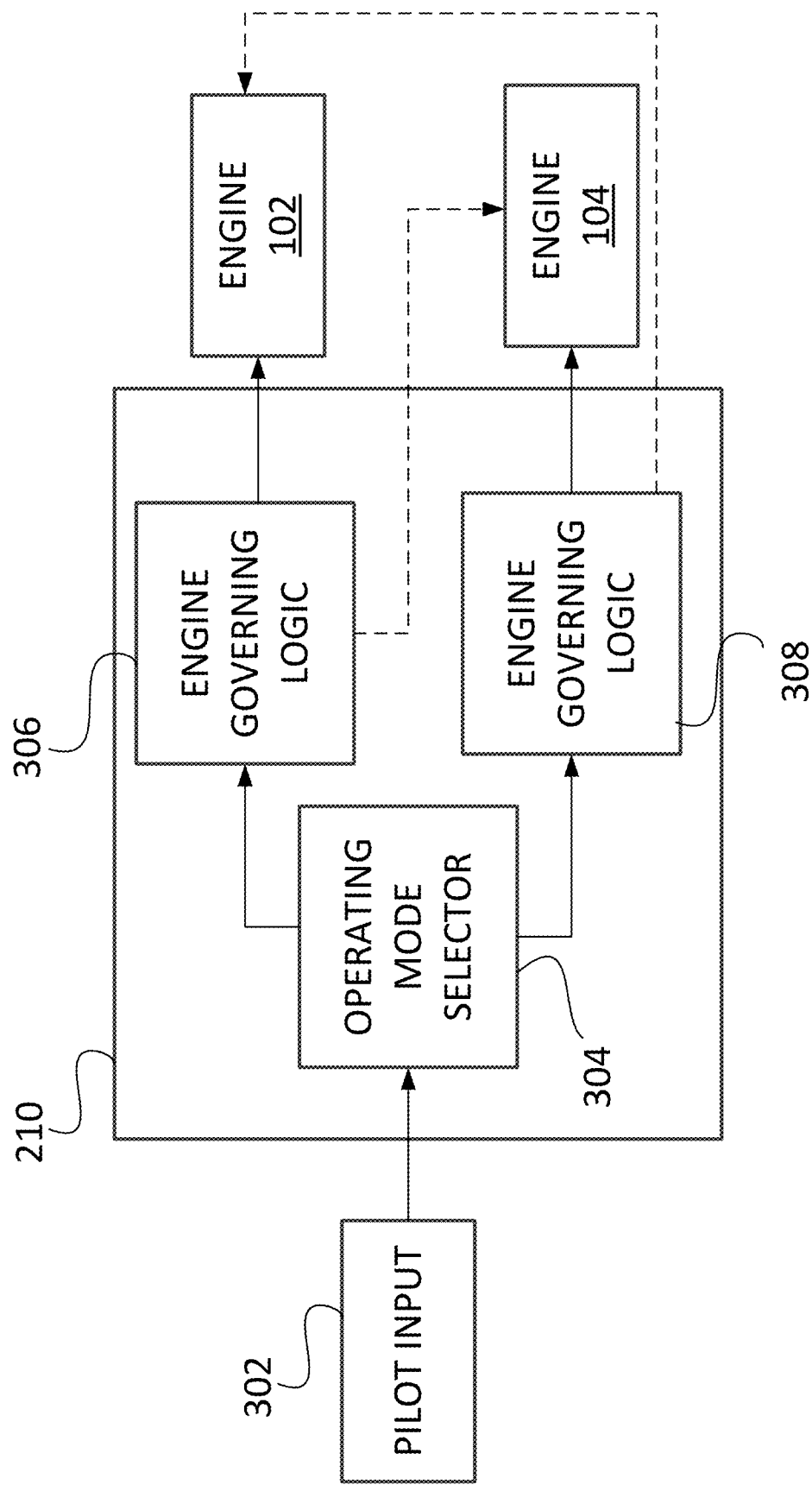
FIG. 3 is a block diagram of an example implementation of an engine controller.

With reference to FIG. 3, the controller 210 comprises an operating mode selector 304, which determines, in response to pilot input 302, an operating mode of the engines 102, 104. For example, the pilot input 302 may cause the engines 102, 104 to be operated in the AOR or in any other operating regime where different governing logics are suitable for the engines 102, 104. The operating mode selector 304 would then cause the two engines 102, 104 to be governed using respective logics for each respective operating mode. More specifically, engine 102 operating in an active mode is governed by the engine governing logic 306 in accordance with a first governing logic, engine 104 operating in a standby mode is governed by the engine governing logic 308 in accordance with a second governing logic. The first governing logic is selected to be suitable for the active mode. The second governing logic is selected to be suitable for the standby mode.

In some embodiments, the first governing logic and the second governing logic are preselected, or predetermined, and set in a respective one of the engine governing logic 306, 308. The operating mode selector 304 may selectively connect the engine governing logic 306, 308 to engines 102, 104 as a function of the operating mode of each respective engine 102, 104.

In some embodiments, the engine governing logic 306, 308 are configured to select a suitable governing logic from two or more available governing logics upon receipt of a signal from the operating mode selector 304 indicative of the operating mode of a respective engine 102, 104. Engine governing logic 306 is associated with engine 102 and will select a suitable governing logic for engine 102 as a function of a signal received from the operating mode selector 304 indicative of the operating mode of engine 102. Engine governing logic 308 is associated with engine 104 and will select a suitable governing logic for engine 104 as a function of a signal received from the operating mode selector 304 indicative of the operating mode of engine 104.

It will be understood that the embodiment of FIG. 3 is merely one example of a configuration for the controller 210. For example, the operating mode selector 304 may also respond to other inputs in order to trigger the different governing logics for the engines 102, 104, such as engine operating parameters, aircraft operating parameters, emergency signals, and the like. In addition, the engine governing logics 306, 308 may be provided in separate implementations of the controller 210, whereby each engine 102, 104 has its own controller 210 capable of governing in accordance with more than one governing logic, as a function of the operating mode of the respective engine 102, 104.

Figure 4A:
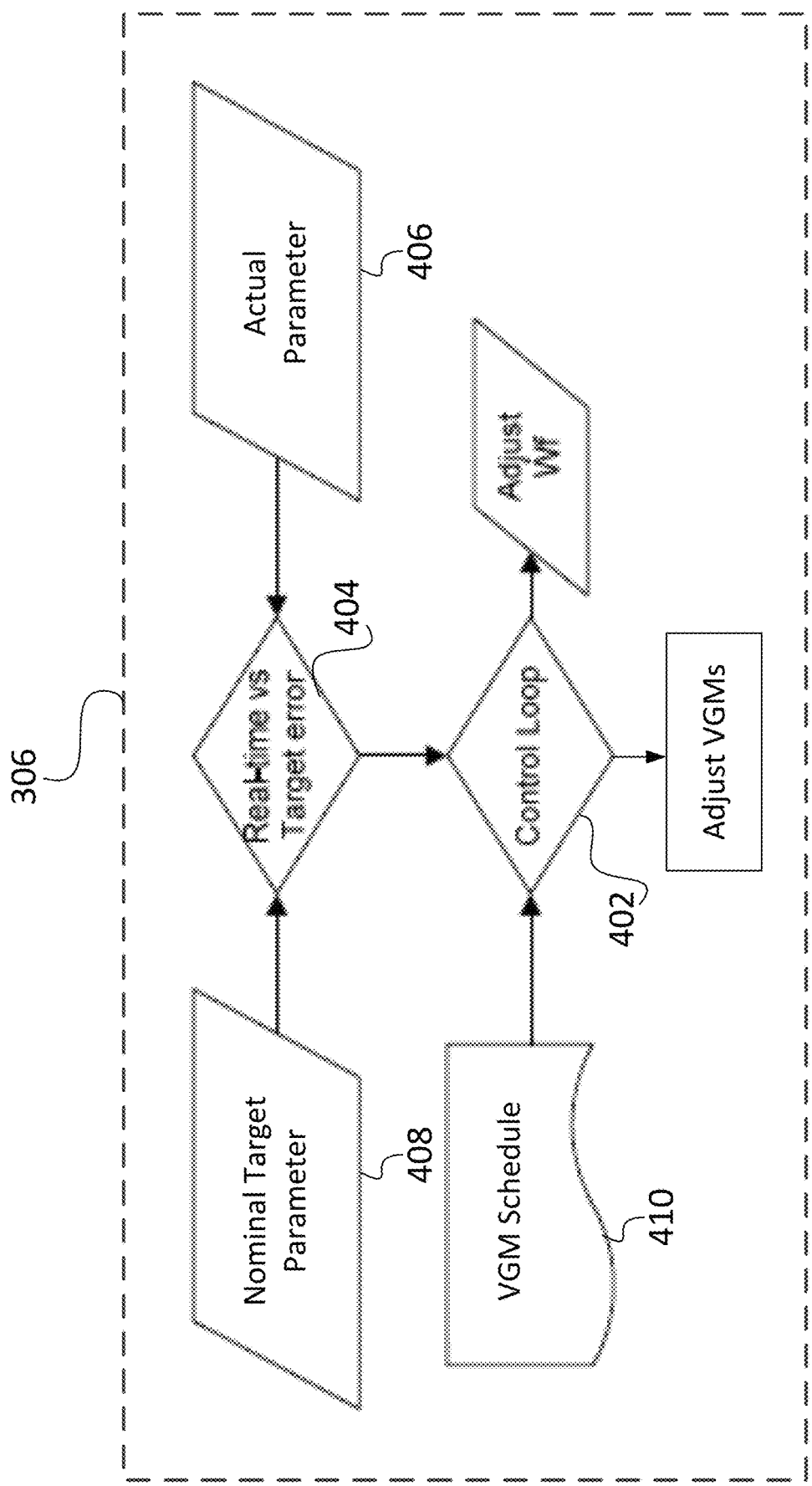
FIGS. 4A-4B are example embodiments of a first governing logic and a second governing logic, respectively.

Turning to FIG. 4A, there is illustrated an example embodiment of the engine governing logic 306 for the first engine 102 operating in the active mode. As described herein, the active mode causes the engine 102 to provide motive power to the aircraft. A control loop 402 adjusts fuel flow ($W_f$) based on an error 404 between an actual target parameter 406 and a nominal target parameter 408. The actual target parameter 406 may be measured, synthesized, or simulated in real-time. The target parameter may be a gas generator speed (Ng), a low-pressure rotor speed (Np), a high pressure rotor speed (Nh), or any other engine parameter on which primary engine governing may be based. The control loop 402 also adjusts the position of the VGMs based on a VGM schedule 410. The governing logic 306 as applied to the active engine 102 may vary from the example illustrated in FIG. 4A. For example, open-loop governing based on fuel flow or other closed-loop governing may also be used.

Figure 4B:
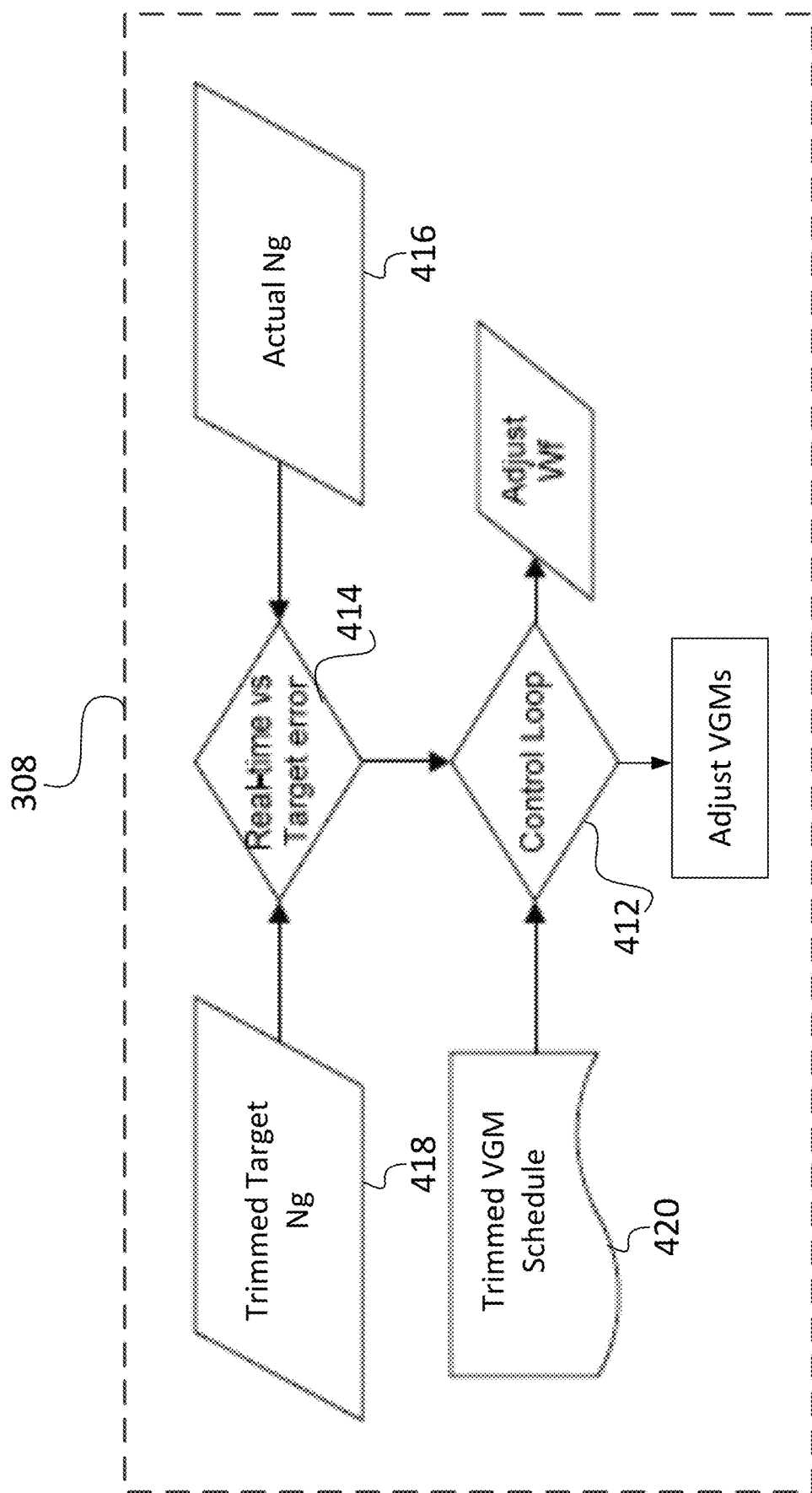

FIG. 4B illustrates an example embodiment of the engine governing logic 308 for the second engine 104 operating in the standby mode. As described herein, the standby mode causes the engine 104 to provide substantially no motive power to the aircraft. A control loop 412 adjusts fuel flow ($W_f$) based on an error 414 between an actual engine compressor speed 416 and a trimmed target engine compressor speed 418. The actual target engine compressor speed 416 may be measured, synthesized, or simulated in real-time. The control loop 412 also adjusts the position of the VGMs based on a trimmed VGM schedule 420 for corresponding compressor speeds. As used herein, the expressions "trimmed", "trimming, and "trim" refer to an adjustment or bias applied to a nominal or original value. In some embodiments, the trim is applied directly to the nominal target parameter or schedule and only the trimmed target parameter or trimmed schedule is used in the engine governing logic 308. In some embodiments, the nominal target parameter or schedule is provided to the engine governing logic 308 and the trim is applied within the governing logic 308. In both embodiments, the control loop 412 bases its adjustments to fuel flow and VGM positions on the trimmed values instead of on the nominal values.

The trimmed target parameter is determined to optimize one or more parameter of the engine 104 when operating in the standby mode. In some embodiments, the optimized parameter is fuel consumption, such that fuel consumption targets specific to the engine 104 operating in standby mode may be used in order to find the trim values for the target compressor speed of the engine 104. In some embodiments, the trim values are associated with a specific engine and differ from one engine to another, i.e the trimmed values are associated with an engine serial number. In some embodiments, the trim values are associated with an engine model and the same trim values may be applied for all engines of the given model. In some embodiments, the trim values are associated with engines of a given engine model having one or more common characteristic, such as a deterioration index or an efficiency level. Other criteria may also be applied to associate trim values with one or more engine.

In some embodiments, the optimized parameter is a compressor stall margin, a compressor surge margin, a compressor flameout margin, or any other suitable engine parameter. In some embodiments, the trim values are set to optimize a plurality of parameters, such as fuel flow and pressure ratio, or stall margin and inlet temperature. Optimization of three or more parameters may also be performed.

In some embodiments, a multi-variable approach is used to optimize the one or more parameter. Indeed, trimming only one engine parameter, such as compressor speed, may allow optimizing of a given parameter such as fuel flow, but cause another parameter, such as pressure ratio, to no longer meet requirements. Trimming is therefore performed on a plurality of engine parameters, such as compressor speed and VGMs, concurrently in order to meet required criteria and optimize at least one parameter.

An example is illustrated in FIG. 5A showing a target parameter (y-axis) vs compressor speed (x-axis). Curve 500 illustrates a set of nominal values for compressor speed as a function of the target parameter, which may be, for example, fuel flow. In this example, the nominal compressor speed is $S_1$ for a target parameter of $TP_1$. Applying a trim 504 to the nominal compressor speed 500 shifts the compressor speed to curve 502, which corresponds to trimmed compressor speed values. For a same target parameter of $TP_1$, the trimmed compressor speed is $S_2$.

Figure 5B:
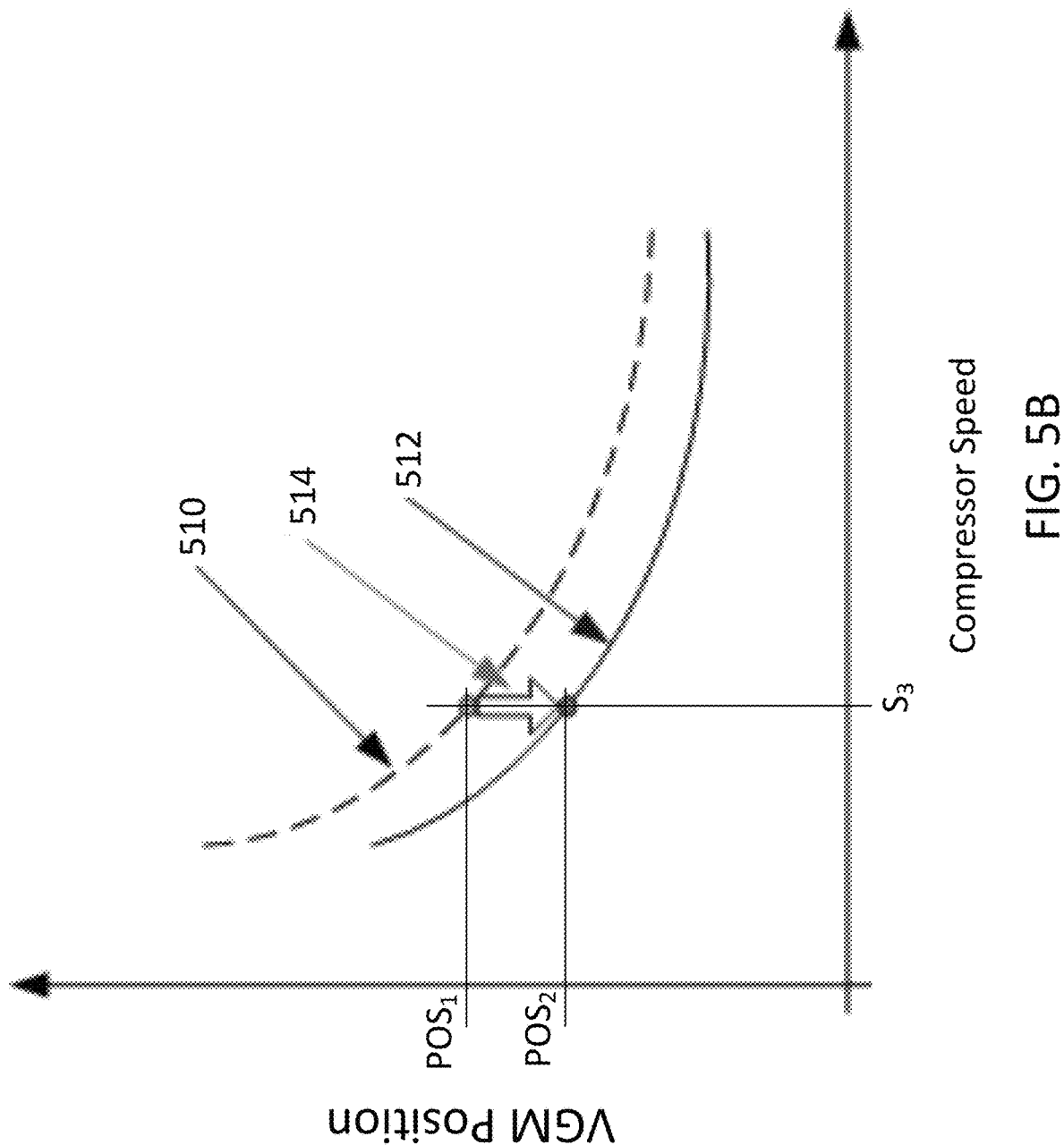

FIG. 5B illustrates a similar example of trimming, applied to a VGM schedule. Curve 510 illustrates a nominal VGM schedule as a function of engine compressor speed. The nominal position for the VGM is set to $POS_1$ for a compressor speed of $S_3$. Applying a trim 514 to the nominal VGM schedule 510 shifts the VGM position to curve 512, which corresponds to a trimmed VGM schedule. For a same compressor speed $S_3$, the trimmed VGM position is $POS_2$.

FIG. 5C illustrates the application of trims on Ng and on VGM by combining the effects of trims 504, 514. Curve 520 represents a nominal target compressor speed with a nominal VGM schedule. Applying trim 524 shifts the value for the compressor speed over to curve 522, which represents a trimmed compressor speed with a trimmed VGM schedule. Applying a trim only to compressor speed would shift point 526 along curve 520 to point 528. Applying a trim only to VGM position would shift point 526 to point 530 on curve 522. Applying trim 524 on the compressor speed and VGM scheduling causes target parameter $TP_2$ to be reached while allowing other engine requirements (or criteria) to be met. This multi-variable approach allows the governing logic 308 to be tailored to the engine 104 as it operates in standby mode such that one or more engine parameter may be optimized using two or more control variables.

In some embodiments, the trims are determined during production of the engine 104, while running the engine in a test cell. Trim values may be uploaded to the controller 210, and/or to the engine governing logic 308. Trim values may also be determined through simulation and/or modeling of the engine, either offline or through the controller 210. Trim values may be proportionally scaled as a function of one or more parameter, such as altitude, outside air temperature, etc., to determine a final trimmed target compressor speed and/or trimmed VGM schedule. Scaling may be performed by the governing logic 308 as a function of a specific operating point in the envelope at a given point in time.

Figure 6:
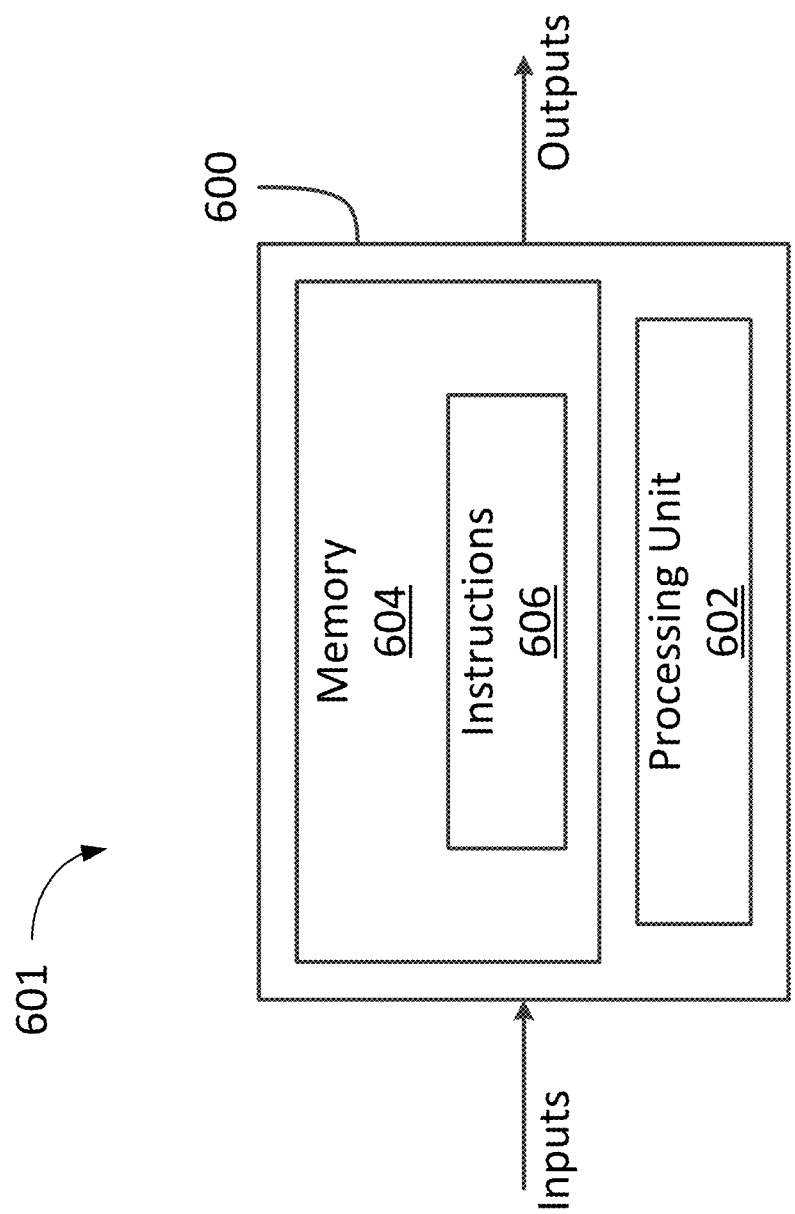
FIG. 6 is a block diagram of an example computing device.

In some embodiments, the controller 210 is implemented as a system 601 for operating an aircraft having two or more engines, in one or more computing device 600, as illustrated in FIG. 6. For simplicity only one computing device 600 is shown but the system 601 may include more computing devices 600 operable to exchange data. For example, each engine governing logic 306, 308 may be implemented in a separate computing device 600. The computing devices 600 may be the same or different types of devices. Note that the system 601 can be implemented as part of a full-authority digital engine controls (FADEC) or other similar device, including electronic engine control (EEC), engine control unit (ECU), electronic propeller control, propeller control unit, and the like. Other embodiments may also apply.

The computing device 600 comprises a processing unit 602 and a memory 604 which has stored therein computer-executable instructions 606. The processing unit 602 may comprise any suitable devices configured to implement a method such that instructions 606, when executed by the computing device 600 or other programmable apparatus, may cause the functions/acts/steps to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

Figure 7:
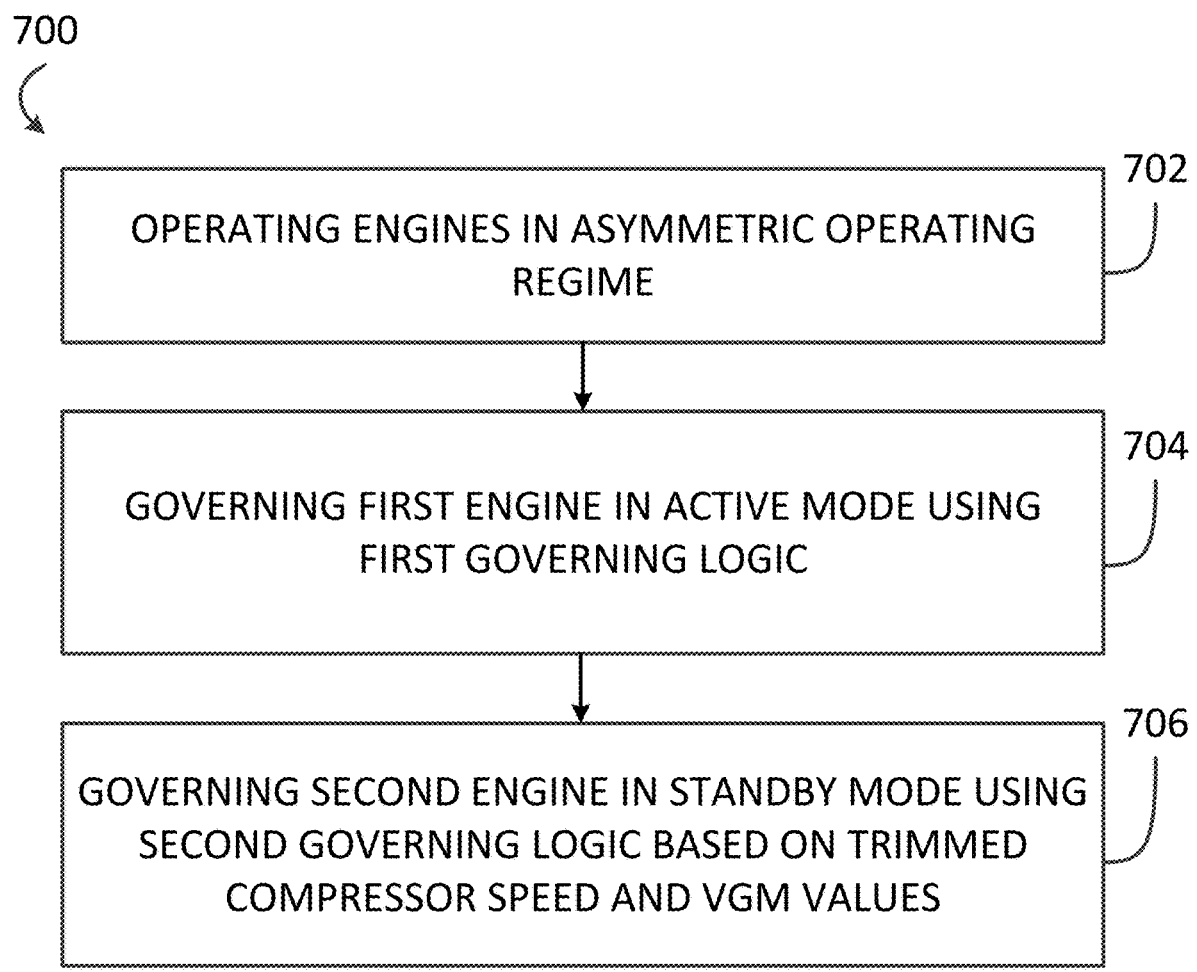
FIG. 7 is a flowchart of a method for operating an aircraft having two or more engines.

With reference to FIG. 7, there is illustrated an example method 700 as performed by the system 601 for operating an aircraft having two or more engines. At step 702, the two or more engines are operated in the asymmetric operating regime. As such, a first of the engines is in an active mode to provide motive power to the aircraft and a second of the engines is in a standby mode to provide substantially no motive power to the aircraft.

At step 704, the first engine is governed using a first governing logic. The first governing logic may be an open-loop or closed-loop governing logic. The first governing logic may govern on the basis of fuel flow, Ng, Nh, Np, or any other engine parameter.

At step 706, the second engine is governed using a second governing logic. The second governing logic is a closed-loop governing logic based on compressor speed and VGM settings. The nominal target compressor speed and nominal VGM settings are adjusted using trim values dependent on at least one parameter of the second engine in the standby mode. The at least one parameter may be one or more of fuel consumption, stall margin, flameout margin, and any other parameter that differs when the engine is operating in the standby mode vs a regular or active power mode. The VGM settings may be for variable inlet guide vanes, bleed-off valves, or any other mechanism of the engine having a variable position and for which varying the position causes a change in engine operation.

In some embodiments, the trim values are determined during a production phase of the engine and uploaded to the computing device 600 for use with the second governing logic. In some embodiments, the trim values are determined by the computing device 600. In some embodiments, the computing device 600 and/or the governing logic retrieves the trim values from a storage medium as needed. In some embodiments, the target compressor speed and VGM settings provided to the second governing logic have been adjusted with the trim values.

It will be understood that the present disclosure also teaches a method for operating a gas turbine engine operating in a given operating mode, whereby the operating mode causes the engine to operate in power range having thermodynamic/aerodynamic particularities. The thermodynamic/aerodynamic particularities are addressed by using trimmed values for target compressor speed and VGM settings that are dependent on at least one parameter of the engine when in the given operating mode. The engine governing logic applied while in the operating mode determines an error between the adjusted target compressor speed and an actual compressor speed of the engine, and adjusts fuel flow to the engine based on the error when the engine is in the given operating mode, as illustrated in the example governing logic of FIG. 4B.

The methods and systems described herein may be implemented in a high level procedural or object oriented programming or scripting language, or a combination thereof, to communicate with or assist in the operation of a computer system, for example the computing device 600. Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 700.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, trim values may be applied to compressor speed, VGM settings, and one or more additional parameter concurrently in order to optimize operation of the engine in the standby mode. The engine may be a turbofan or turboshaft instead of a turboprop. The engine may have a single spool instead of multiple spools. Yet further modifications could be implemented by a person of ordinary skill in the art in view of the present disclosure, which modifications would be within the scope of the present technology.

The invention claimed is:

1. A method for operating an aircraft having two or more engines, the method comprising:

operating the two or more engines of the aircraft in an asymmetric operating regime, wherein a first of the engines is in an active mode to provide motive power to the aircraft and a second of the engines is in a standby mode to provide substantially no motive power to the aircraft;

governing the first engine in the active mode using a first governing logic; and governing the second engine in the standby mode using a second governing logic different from the first governing logic, the second governing logic based on a trimmed target compressor speed and trimmed variable geometry mechanism (VGM) settings, the trimmed target compressor speed including a nominal target compressor speed adjusted using a first engine-specific trim value, the trimmed VGM settings including nominal VGM settings adjusted using a second engine-specific trim value, the first engine-specific trim value and the second engine-specific trim value being specific to the second engine and dependent on at least one parameter including fuel consumption of the second engine in the standby mode.

2. The method of claim 1, wherein the first engine-specific trim value and the second engine-specific trim value are determined during a production phase of the second engine.

3. The method of claim 1, wherein the at least one parameter of the second engine in the standby mode comprises at least one of surge margin and flameout margin.

4. The method of claim 1, wherein the VGM settings are for at least one of a bleed off valve and variable inlet guide vanes of the second engine.

5. The method of claim 1, wherein the second governing logic comprises a control loop configured for:

receiving as a first input an error between an actual compressor speed of the second engine and the trimmed target compressor speed;

receiving as a second input the trimmed VGM settings; and adjusting a fuel flow and a VGM of the second engine using the first input and the second input.

6. A system for operating an aircraft having two or more engines, the system comprising:

at least one processing unit; and a non-transitory computer readable medium having stored thereon program code executable by the at least one processing unit for:

operating the two or more engines of the aircraft in an asymmetric operating regime, wherein a first of the engines is in an active mode to provide motive power to the aircraft and a second of the engines is in a standby mode to provide substantially no motive power to the aircraft;

governing the first engine in the active mode using a first governing logic; and governing the second engine in the standby mode using a second governing logic different from the first governing logic, the second governing logic based on a trimmed target compressor speed and trimmed variable geometry mechanism (VGM) settings, the trimmed target compressor speed including a nominal target compressor speed adjusted using a first engine-specific trim value, the trimmed VGM settings including nominal VGM settings adjusted using a second engine-specific trim value, the first enqine-specific trim value and the second enqine-specific trim value being specific to the second engine and dependent on at least one parameter including fuel consumption of the second engine in the standby mode.

7. The system of claim 6, wherein the first engine-specific trim value and the second engine-specific trim value are determined during a production phase of the second engine.

8. The system of claim 6, wherein the at least one parameter of the second engine in the standby mode comprises at least one of surge margin and flameout margin.

9. The system of claim 6, wherein the VGM settings are for at least one of a bleed off valve and variable inlet guide vanes of the second engine.

10. The system of claim 6, wherein the second governing logic comprises a control loop configured for:
receiving as a first input an error between an actual compressor speed of the second engine and the trimmed target compressor speed;
receiving as a second input the trimmed VGM settings;
and adjusting a fuel flow and a VGM of the second engine using the first input and the second input.

* * * * *